(12) United States Patent
Fitch et al.

(10) Patent No.: US 9,311,230 B2
(45) Date of Patent: Apr. 12, 2016

(54) LOCAL DIRECT STORAGE CLASS MEMORY ACCESS

(71) Applicant: GLOBALFOUNDRIES INC., Grand Cayman (KY)

(72) Inventors: Blake G. Fitch, Croton-on-Hudson, NY (US); Michele M. Franceschini, White Plains, NY (US); Lars Schneidenbach, Mt. Kisco, NY (US); Bernaard Metzler, Zurich (CH)

(73) Assignee: GLOBALFOUNDRIES INC., Grand Cayman (KY)

( * ) Notice: Subject to any disclaimer, the term of this patent is extended or adjusted under 35 U.S.C. 154(b) by 172 days.

(21) Appl. No.: 13/975,643

(22) Filed: Aug. 26, 2013

(65) Prior Publication Data

US 2014/0317336 A1 Oct. 23, 2014

Related U.S. Application Data

(60) Provisional application No. 61/815,169, filed on Apr. 23, 2013.

(51) Int. Cl.

| G06F 12/00 | (2006.01) |
|---|---|
| G06F 12/02 | (2006.01) |
| G06F 15/173 | (2006.01) |
| H04L 29/08 | (2006.01) |
| G06F 12/10 | (2006.01) |

(52) U.S. Cl.
CPC ...... *G06F 12/0246* (2013.01); *G06F 15/17331* (2013.01); *H04L 67/1097* (2013.01); *G06F 12/109* (2013.01)

(58) Field of Classification Search
None
See application file for complete search history.

(56) References Cited

U.S. PATENT DOCUMENTS

| 2004/0010545 A1* | 1/2004 | Pandya | 709/203 |
|---|---|---|---|
| 2006/0075119 A1* | 4/2006 | Hussain et al. | 709/227 |
| 2007/0288921 A1* | 12/2007 | King et al. | 718/1 |
| 2011/0246598 A1* | 10/2011 | Pinkerton et al. | 709/212 |
| 2012/0331153 A1* | 12/2012 | Aho et al. | 709/227 |
| 2014/0089585 A1* | 3/2014 | Nakajima et al. | 711/118 |
| 2014/0258438 A1* | 9/2014 | Ayoub | 709/212 |
| 2014/0280666 A1* | 9/2014 | Cardona et al. | 709/212 |

OTHER PUBLICATIONS

Robert Russell, Introduction to RDMA Programming, 2012, IOL.*

(Continued)

*Primary Examiner* — Baboucarr Faal
(74) *Attorney, Agent, or Firm* — Scully Scott Murphy and Presser

(57) ABSTRACT

A queued, byte addressed system and method for accessing flash memory and other non-volatile storage class memory, and potentially other types of non-volatile memory (NVM) storage systems. In a host device, e.g., a standalone or networked computer, having attached NVM device storage integrated into a switching fabric wherein the NVM device appears as an industry standard OFED™ RDMA verbs provider. The verbs provider enables communicating with a 'local storage peer' using the existing OpenFabrics RDMA host functionality. User applications issue RDMA Read/ Write directives to the 'local peer (seen as a persistent storage) in NVM enabling NVM memory access at byte granularity. The queued, byte addressed system and method provides for Zero copy NVM access. The methods enables operations that establish application private Queue Pairs to provide asynchronous NVM memory access operations at byte level granularity.

15 Claims, 9 Drawing Sheets

(56) References Cited

OTHER PUBLICATIONS

Huffman, "NVM Express", Intel Corporation, Hillsboro, Oregon, Revision 1.0e, Jan. 23, 2013, Specification, pp. 1-127.

"OFED Oviewview", Openfabrics Alllicance, https://www.openfabrics.org/ofed-for-linex-ofed-for-windows/ofed-overview.html, last downloaded Aug. 26, 2013.

Jones, "Anatomy of the Linux networking stack", IBM developerWorks, http://www.ibm.com/developerworks/linux/library/l-linux-networking-stack/, last downloaded Apr. 19, 2013, pp. 1-6.

"Remote direct memory access", Wikipedia, http://en.wikipedia.org/wiki/Rdma, last downloaded Apr. 19, 2013.

* cited by examiner

LOCAL DIRECT STORAGE CLASS MEMORY ACCESS

CROSS-REFERENCE TO RELATED APPLICATIONS

The present application claims priority of U.S. provisional application Ser. No. 61/815,169 filed Apr. 23, 2013, which is also incorporated herein by reference.

FIELD

The present disclosure relates generally to systems and methods for accessing flash and non-volatile memory (NVM) storage systems, and particularly to a byte oriented access method that supports highly multicore computing systems.

BACKGROUND

Typically, in multi-processing computing systems, non-volatile memory/storage, "NVM", such as fast Flash and Storage Class Memory is packed/interfaced as fast hard disk drive (SSD).

Further, some multi-processing and parallel computing systems currently implement networking standards or protocols, to maintain connections between multiple computer nodes (e.g., high performance computing nodes) and I/O nodes such as storage devices, e.g., hard disk drive memory storage devices. The Internet protocol suite based on the TCP and IP protocols is just one example. Other examples for networked storage device I/O connection standards for accessing hard disk storage devices and SSDs include the iSCSI protocol, which is an upper layer protocol based on TCP/IP. Running these protocols to exchange data between computing systems or computing systems and storage systems typically involves overhead due to copying the data to be communicated between involved application programs and the network protocol stack, and within the protocol stack.

RDMA (Remote Direct Memory Access) is a communication paradigm to overcome this performance problem while transferring content of local memory to a peer hosts remote memory or vice-versa without involving either one's operating system during the actual data transfer and thus avoiding any data copy operation otherwise needed. Several protocol suites exist to implement an RDMA communication stack. Infiniband ® (Trademark of System I/O, Inc., Beaverton, OR), iWarp, and RoCEE (RDMA over Converged Enhanced Ethernet) are three example network technologies which can be deployed to implement an RDMA stack. These technologies use different network link technologies and different network packet formats to exchange RDMA messages between hosts.

Further, there currently exist switched fabric technologies infrastructure for server and storage connectivity such as the OpenFabrics Enterprise Distribution (OFED™ (Trademark of Open Fabrics Alliance, INC. California). OpenFabrics is an industry standard framework for a host implementation of the RDMA communication paradigm comprising the definition of an application programming interface (RDMA 'verbs' API) and generic user level and operating system level components to which network technology specific and vendor specific components can be attached in a standardized way. OpenFabrics is open-source software for RDMA and kernel bypass applications for use in high performance, highly efficient networks, storage connectivity and parallel computing. The OFED™ programming interface allows an application to access memory of a remote machine via RDMA directives such as RDMA Read, RDMA Write, RDMA Send and RDMA Receive.

FIG. 1 particularly shows an example prior art model 10 implementing OFED™ connectivity standard used in context of RDMA in a network 12 having nodes that execute tasks and may access other networked nodes. Particularly, in the embodiment depicted in FIG. 1, host devices, e.g., networked computing devices, i.e., "peerA" device 16, and "PeerB" device 18, etc. on two different machines, and the communications network 12 that interconnects them create RDMA connections by first registering their respective virtual memory regions 26, 28. Then the peers 16,18, according to OFED™ standard directives, may perform RDMA READ/ WRITE operations directly into a remote peer's virtual memory address space. For example, peer 16 may access virtual memory region 28 of peer 18 device via RDMA commands 27, and peer 18 may access virtual memory region 26 of peer 16 device via RDMA commands 25. The respective Infiniband adapters 22, 24 each performs the RDMA operations responsive to commands from the remote peer CPU and control path elements. The work queues 17 in PeerA and work queues 19 in PeerB have entries such as RDMA read or write directives and a respective control paths 13, 15 provides connectivity to trigger the respective Infiniband adapter to perform the RDMA.

Further, there currently exists a NVMe (Non-volatile memory Express) (www.nvmexpress.org/) describing a new standard to access PCI-attached NVM SSD's. This standard is based on an asynchronous multi-queue model, however, is still block based accessed (e.g., in a multiple byte unit such as 512 bytes, 4096 bytes, 16 Kilobytes etc.). That is, access to the fast Flash and Storage Class Memory (NVM) as persistent memory/storage is slowed down by classic "block access" methods developed for mechanical media (e.g., hard disks) in currently existing systems. This is a problem in that implementing block access methods increases NVM memory access and storage times.

With more particularity, current host controller devices, such as device 35 of FIG. 2, provide interfaces such as AHCI (HBA), SCSIe, or NVMe for PCI Express attached SSDs. In the case of NVMe, the controller 35 includes functionality for partitioning w/multiple ports, providing parallel IO, Scatter-gather-support, and up to 64'000 I/O Command (Send) Queues, with a maximum command depth of 64'000 entries, and Completion Queues.

FIG. 2 shows an example of the NVMe standard block device access for a multi-core (multiprocessing) system 30 which interprets memory as a hard disk. It does not provide byte addressability. In FIG. 2, a user application via a controller interface 35 creates a work request(s) e.g., write, write a block of data to a specified location, e.g., a sector x, and fetch data for user at an address "y". This work request(s) is(are) placed in a respective command queue or send queue (SQ) such as SQ 31 associated with a first computing device (e.g., processor Core, and SQ 34 associated with another computing device (e.g., processor Core n). As shown, each core 31, 34 of the multi-core (multiprocessing) system is in communication with the controller device 35 that is configured to process the queue entries for each host or core. The notification(s) are received at a respective completion queues (CQ) 33, 36 of each respective core, and the application reads/processes the CQ to know when the data request is completed.

As shown in FIG. 3, an OFED™ software stack framework 50 includes kernel-level drivers 52, channel-oriented RDMA and send/receive operations, kernel bypasses of the operating system 53, both kernel level application programming interface (API) 55 and user-level API 57 and providing services for parallel message passing (MPI), sockets data exchange (e.g., RDS, SDP), NAS and SAN storage (e.g. iSER, NFS-RDMA, SRP) and file system/database systems. The network and fabric technologies that provide RDMA performance with OFED™ include: legacy 10 Gigabit Ethernet, iWARP, RoCE and 10/20/40 Gigabit InfiniBand.

The OFED™ framework defines access to remote memory at byte granularity and thus avoids the drawbacks of block-based access of protocols such as NVMe. Nevertheless, the OFED™ framework is currently defined for only accessing remote computer memory via a network link, and thus cannot be used to access local Non Volatile Memory.

A new byte oriented access method for local NVM is necessary. This access method must support highly parallel or multicore systems.

BRIEF SUMMARY

A queued, byte addressed system and method for accessing flash memory and other non-volatile storage class memory, and potentially other types of non-volatile memory storage systems.

A queued, byte addressed system and method for accessing flash memory and other non-volatile storage class memory that reduces the burden on the internal busses of the hardware (e.g., PCI bus that connects hardware to the computing system) and enables different access patterns that are required by a certain set of applications (e.g., databases) that do not use a block as a unit of access, but rather units smaller than a block. The system and method makes it easier to access as the data from the block does not have to be processed to access only a smaller amount of data.

In one embodiment, the system and method incorporates the NVM on a local PCI card (bus) and characterizes it as remote memory in the OFED™ framework. Thus, the OFED™ standard RDMA Read/Write directives can be used.

Thus, in one aspect, there is provided a computing system, the computing system comprising: an attached or integrated local non-volatile memory (NVM); and a host processing unit in communication with the NVM and configured to perform a method to: embed, in the computing system, a virtual peer device representation of a remotely networked device normally communicating in accordance with a remote direct memory access (RDMA) infrastructure for data storage and transfer among multiple networked devices, establish, via the virtual peer device, a RDMA infrastructure interface between an application run by the host processing unit and local NVM; register the local NVM with the modeled remote direct memory access (RDMA) infrastructure for read and write local NVM access, and process received RDMA switched fabric technology infrastructure Read directives to read data via the interface from the local non volatile memory, and process received RDMA switched fabric technology infrastructure Write directives to write data via the interface to the local non volatile memory.

In a further aspect, there is provided a method for accessing a non volatile memory access system comprising: embedding, in a computing system, a virtual peer device representation of a remotely networked device normally communicating in accordance with a remote direct memory access (RDMA) infrastructure for data storage and transfer among multiple networked devices, establishing, via the virtual peer device, a RDMA infrastructure interface between an application run by the host processing unit and local NVM; registering the local NVM with the modeled remote direct memory access (RDMA) infrastructure for read and write local NVM access, and processing received RDMA infrastructure Read directives to read data via the interface from the local non volatile memory, and processing received RDMA infrastructure Write directives to write data via the interface to the local non volatile memory, wherein a programmed processor unit is configured to initiate the embedding, establishing, registering, and the Read and Write directives processing.

A computer program product is provided for performing operations. The computer program product includes a storage medium readable by a processing circuit and storing instructions run by the processing circuit for running a method. The storage medium readable by a processing circuit is not only a propagating signal. The method is the same as listed above.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

A queued, byte addressed system and method for accessing local flash and other local non-volatile storage class memory storage systems is provided.

The system includes a new method of accessing local NVM. A host device (e.g., a personal computer or workstation) integrates NVM as local attached memory, and characterizes it as remotely accessible (RDMA) memory such that it is visible to an application as if it was remote memory in the OFED™ framework. The host provides the existing OpenFabrics RDMA host infrastructure and uses Read/Write NVM via RDMA work requests (Read/Write).

Advantageously, besides allowing byte level NVM access, integration enables NVM to appear to an application as RDMA memory and provides "Zero copy" data transfer between application buffer (host memory) and the NVM such that (in the context of OFED™ framework) data is transferred directly from one buffer (e.g., network adapter) to another buffer, e.g., to or from application memory, while eliminating the need to copy data between application memory and the data buffers in the operating system thereby eliminating work to be done by the CPU(s), memory caches, or context switches, and enabling transfers continue in parallel with other system operations. Thus, control structures are provided within the OFED™ framework to transfer data along a path without making an intermediary copy of the transferred data between host memory and NVM memory.

Figure 1:
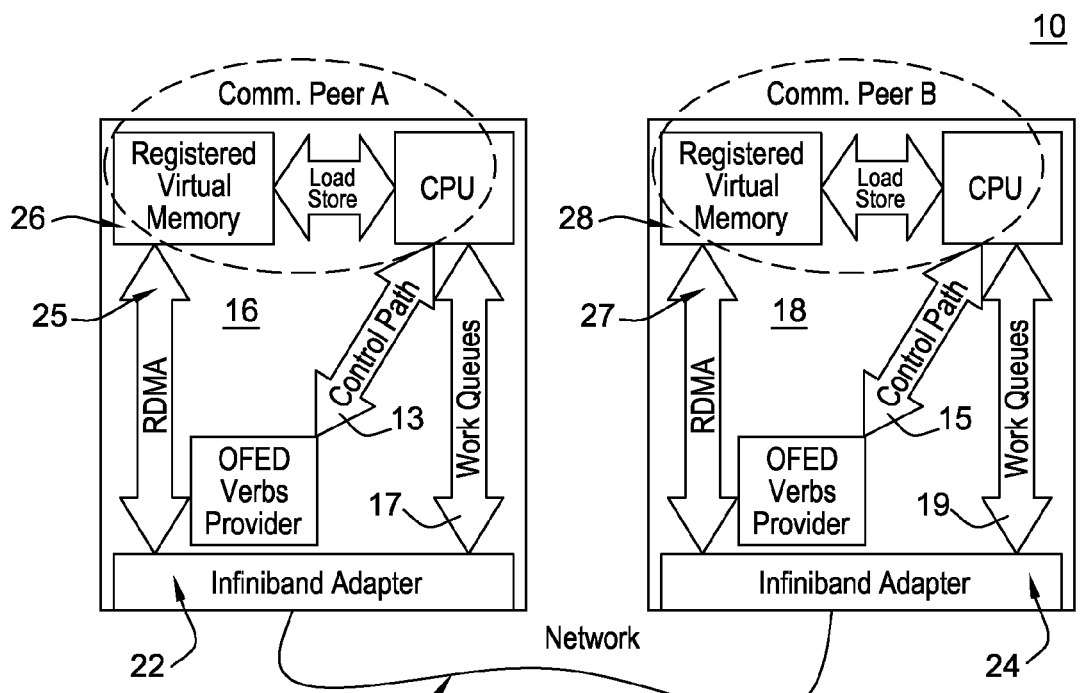
FIG. 1 particularly shows an example prior art model 10 implementing OFED™ connectivity standard used in context of RDMA in a network.
Figure 2:
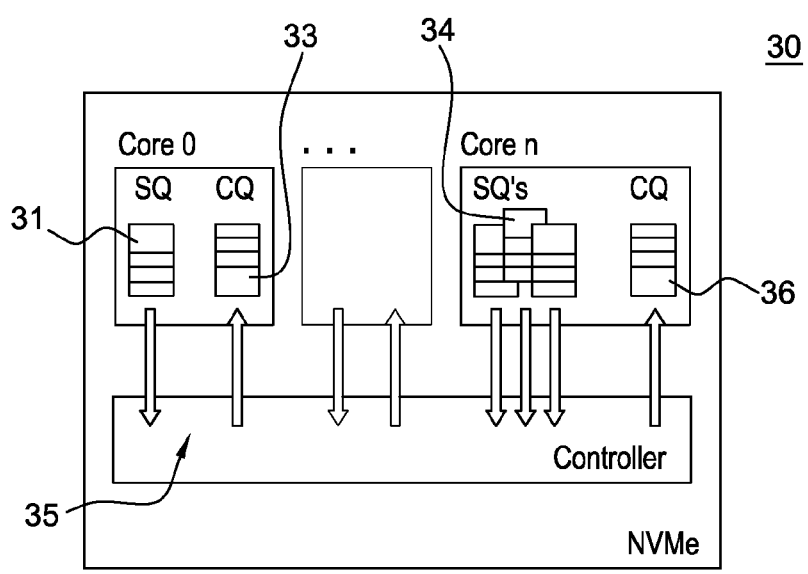
FIG. 2 shows an example prior art NVMe standard block device access for a multi-core (multiprocessing) system.
Figure 4:
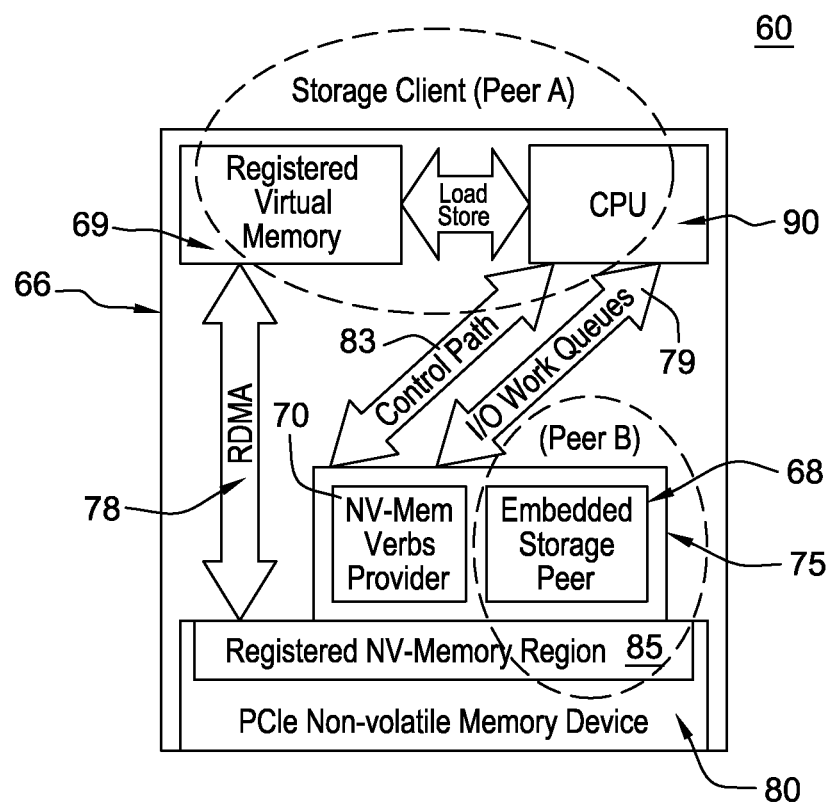
FIG. 4 depicts the OFED™ Model 60 of FIG. 1 implemented for RDMA to/from an attached or integrated local Non-Volatile Memory according to one embodiment.

FIG. 4 particularly shows an OFED™ Model 60 of FIG. 1 implemented for RDMA to/from local Non-Volatile Memory, e.g., a PCIe NVM memory device within a single host device 66. In FIG.4, the OFED™ implemented for RDMA to/from a local Non-Volatile Memory shows a Peer A computing device 66 including an NVM Verbs Provider (NVP) 70 integrated in the OFED™ stack, e.g., at provider level 75, and the prior art remote computing device "Peer B" of FIG. 1 is virtualized to appear as a remote "peer" device 68 for Peer A, the host 66. In one embodiment, as shown in FIG. 4, there is no connection to the outside world, i.e., there is no Infiniband adapter. Rather, a PCI express card 80 is provided that has NVM memory 85. In an alternative embodiment, the Infiniband® adapter of the prior art configuration of FIG. 1 becomes a network interface card in the host device 66 of FIG. 4. The Peer B (of FIG. 1) is now a virtual embedded storage "Peer"68 that pretends the whole NVM on the card is its own local memory, i.e., local memory of Peer B. It (i.e., memory 85 of Peer B) appears as if it is remote to Peer A 66 according to RDMA standard.

Thus, as shown in FIG. 4, the system and method provides components and corresponding functionality that complies with the Open Fabrics Alliance (OFED™) standard as a verbs provider. This verbs provider 70 has a single "embedded storage peer" 68. FIG. 4 particularly shows OFED™ RDMA communication path 78 between a registered virtual memory area 69 (e.g., DRAM) of host PeerA storage client 66 and the local attached or integrated non-volatile memory device 85. In this embodiment, the embedded storage peer, e.g., example Peer B 68, has fixed functionality. In operation, the host performs a RDMA READ/WRITE operations 78 to/from its DRAM memory 69 and non-volatile memory 85. For example, for a read request, data is placed from the PCIe thru DMA to the registered virtual memory 69 of the host, for access by the central processing unit (i.e., host CPU 90). Dynamically generated work queues 79 having RDMA Read/Write directives as entries are controlled to communicate the directives along control path 83. It is understood that the "local peer" is the OFED™ term for an application that is running on the same machine as the verbs provider.

In implementing the OFED™ system with NVM using RDMA directives at byte granularity, there are two ways to transfer data from a PeerA to a PeerB: send/receive and "read" or "write." The difference is that each send directive has to be matched by a receive. A method specified in a program running in the host device (e.g., a calling application in Peer A) performs a send by specifying the source memory address and the length or size of the data to be transferred, e.g., at single byte length or multiple byte length granularity (e.g., 4 bytes, 16 bytes). PeerB is required to perform a receive operation to determine the destination memory address for the transferred data. Receive parameters are usually the destination address and the length. Using read or write, PeerA determines not only the source address of the data but also the destination address at PeerB. PeerB is not actively involved in the actual data transfer. The same applies for a read operation of PeerA just that data is moved from PeerB to PeerA. Work requests and other commands are "posted" to a send queue or receive queue of a QP represented as i/o work queue 79 in FIG. 4. That is, "read", "write", and "sends" commands are posted to a send queue. "receives" are posted to a receive queue. These queues are "shared" in the sense that a producer and a consumer of requests have access to the queues and producer and consumer are different entities in the system (e.g. the producer for the send queue is the application running at PeerA and the consumer is the NVM verbs provider).

For permission to read to or write from the memory of PeerB, PeerA uses a valid remote tag, also called RTag. This is the preferred way of the OFED™ standard. PeerA requires an RTag for each registered non-volatile memory area and it functions as an identifier of a memory region and as a key that secures the memory of PeerB, for example. As PeerB registers non-volatile memory, a local tag is created for this memory region. One example to encode a local tag is a 32 bit integer. PeerA acquires this local tag, such as by exchanging the local tag via a send/receive data transfer prior to a write or read operation. The local tag becomes a remote tag for PeerA to access the non-volatile memory of PeerB.

While not specified in the OFED™ standard, an operation is further employed that enables "learning partition parameters" providing for a whole class of operations that are uncommon in the context of OFED™ and networks but are common in the context of disk I/O and storage. For example, one example would be "learning the NVM type" or other storage features/capabilities/limitations. When working with storage, an application might want to learn about the storage device but also desire to manipulate configuration settings. All these operations are to be performed by the embedded storage peer (ESP in FIG. 6). In order to trigger the ESP to execute/perform these operations, use is made of the NVM memory send/recv operations. Currently, the same applies to trigger the ESP to "register I/O memory" or "register NVM". However, this send/receive path is only one possibility to trigger certain operations of the ESP. I/O memory, (or better NVM) needs to be registered by the ESP in order to create a valid local tag in PeerB/ESP that the application can acquire as an RTag and use to access the registered NVM area.

Figure 3:
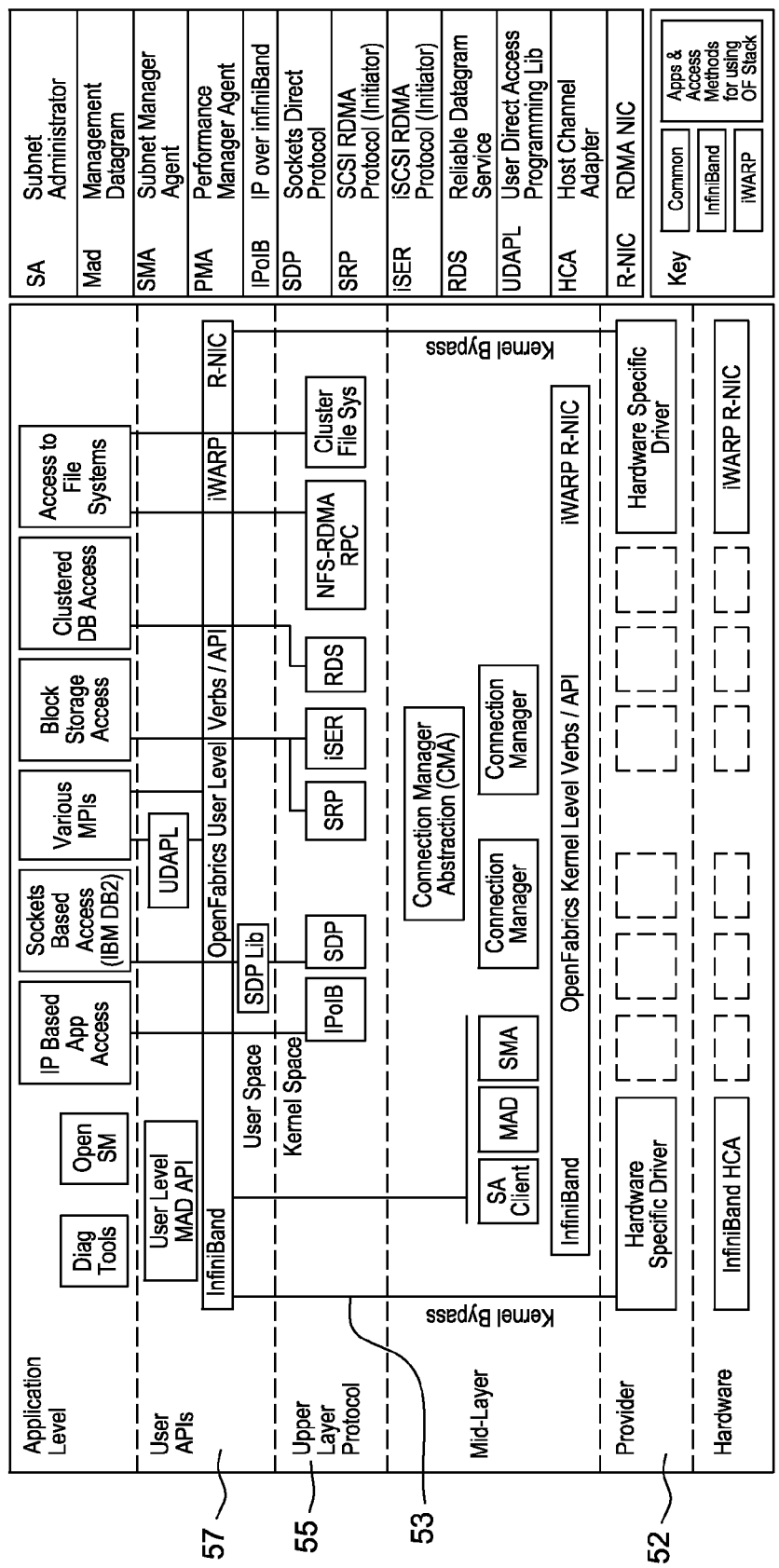
FIG. 3 shows the current OFED™ RDMA software stack framework.
Figure 5:
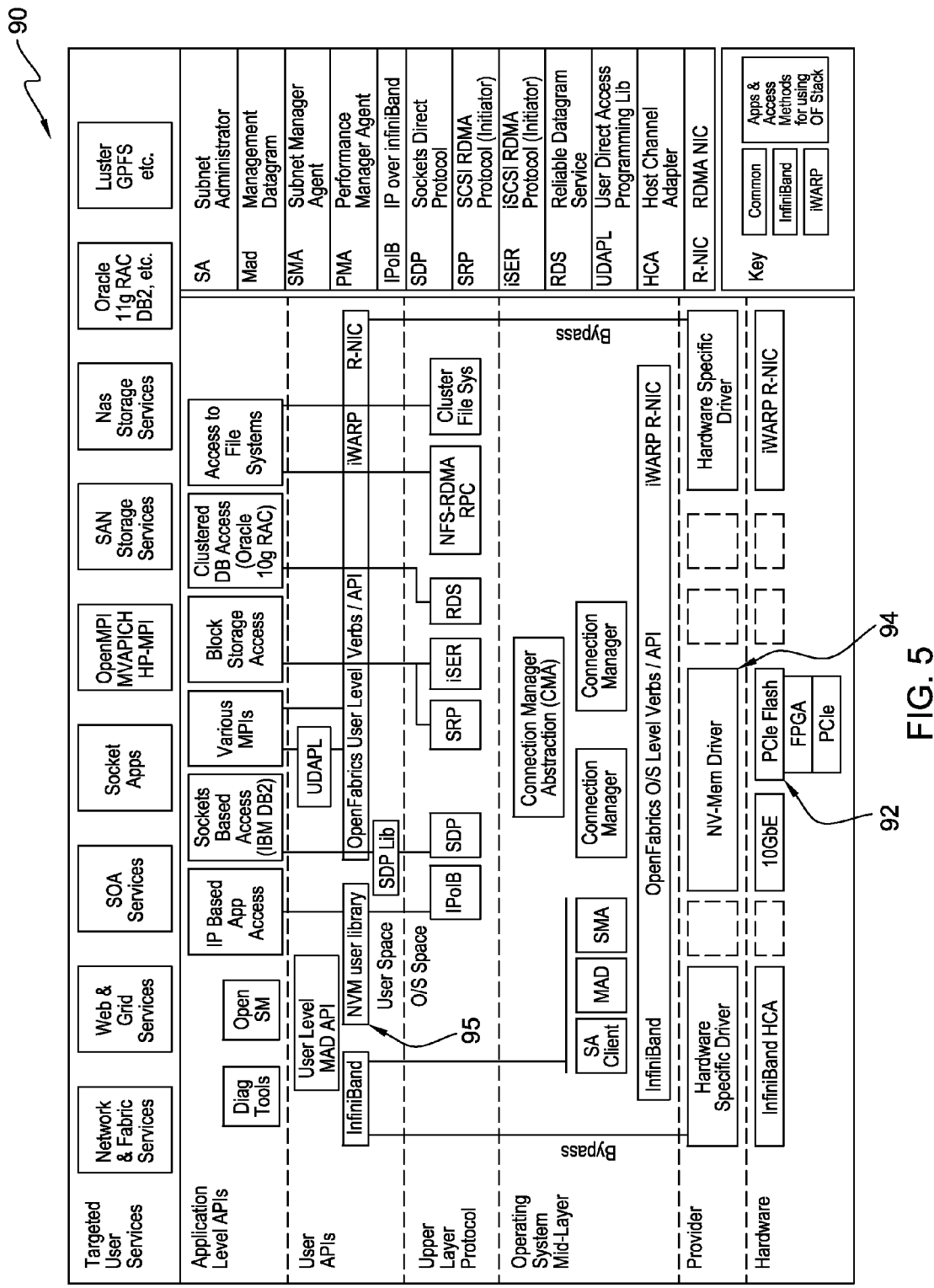
FIG. 5 shows a more detailed example of the integration of the NVM into the OPenFabrics (OFED™) framework of FIG. 3.

FIG. 5 shows a more detailed example of the integration of the NVM into the OPenFabrics (OFED™) framework 50 of FIG. 3. Particularly there is shown a modified OFED™ software stack 90 in the host integrating new hardware NVM 92 (e.g., an underlying PCIe flash drive), and implementing a new access software driver 94 that is provided to support the NVM access, and a new NVP verbs provider 95. This OFED™ stack 90 presents a standards-based message passing interface for kernel and user applications, independent of the underlying NVM flash or SSD device protocol.

It is understood that the manner of communicating between user library and the kernel is dependent upon what different verbs provider is registered in the OFED™ framework; each verbs provider offering different ways. For example, Infiniband has a verbs provider that talks a protocol that fits to the needs of InfiniBand adapters. NVP user library contents depends upon the NVM verbs provider 70 (FIG. 4). OFED™ user library has functionality to discover and detect available devices, and determine available verbs provider 70, e.g., determine if there is a NVM memory card available through the interface. Thus, in one embodiment, there may be stored data using the NVM card and data sent using a Infiniband method card, for example, when the host is equipped.

Figure 6:
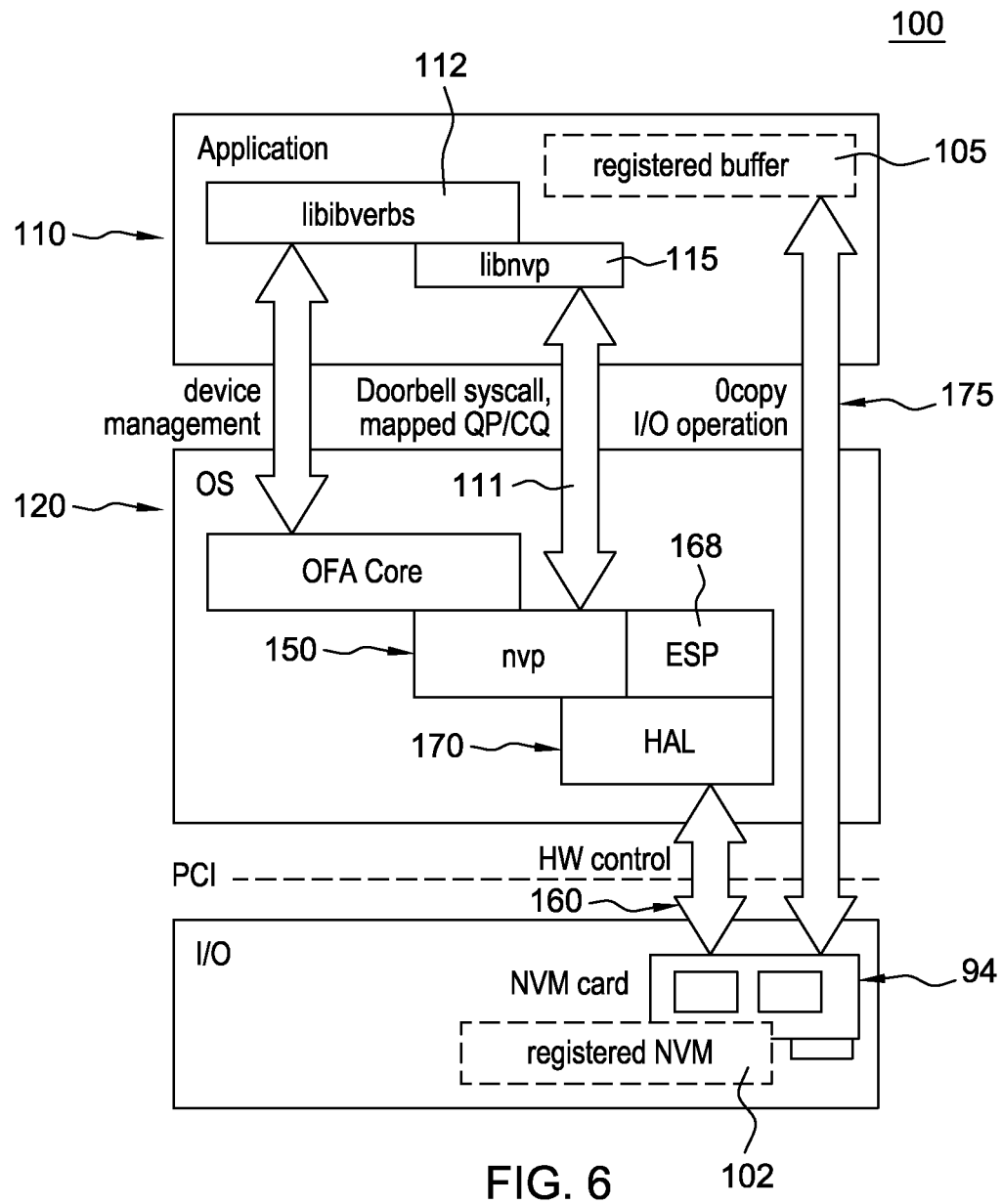
FIG. 6 shows an abstracted example of a modified software stack 100 in which the present system and methods are operated.
Figure 7:
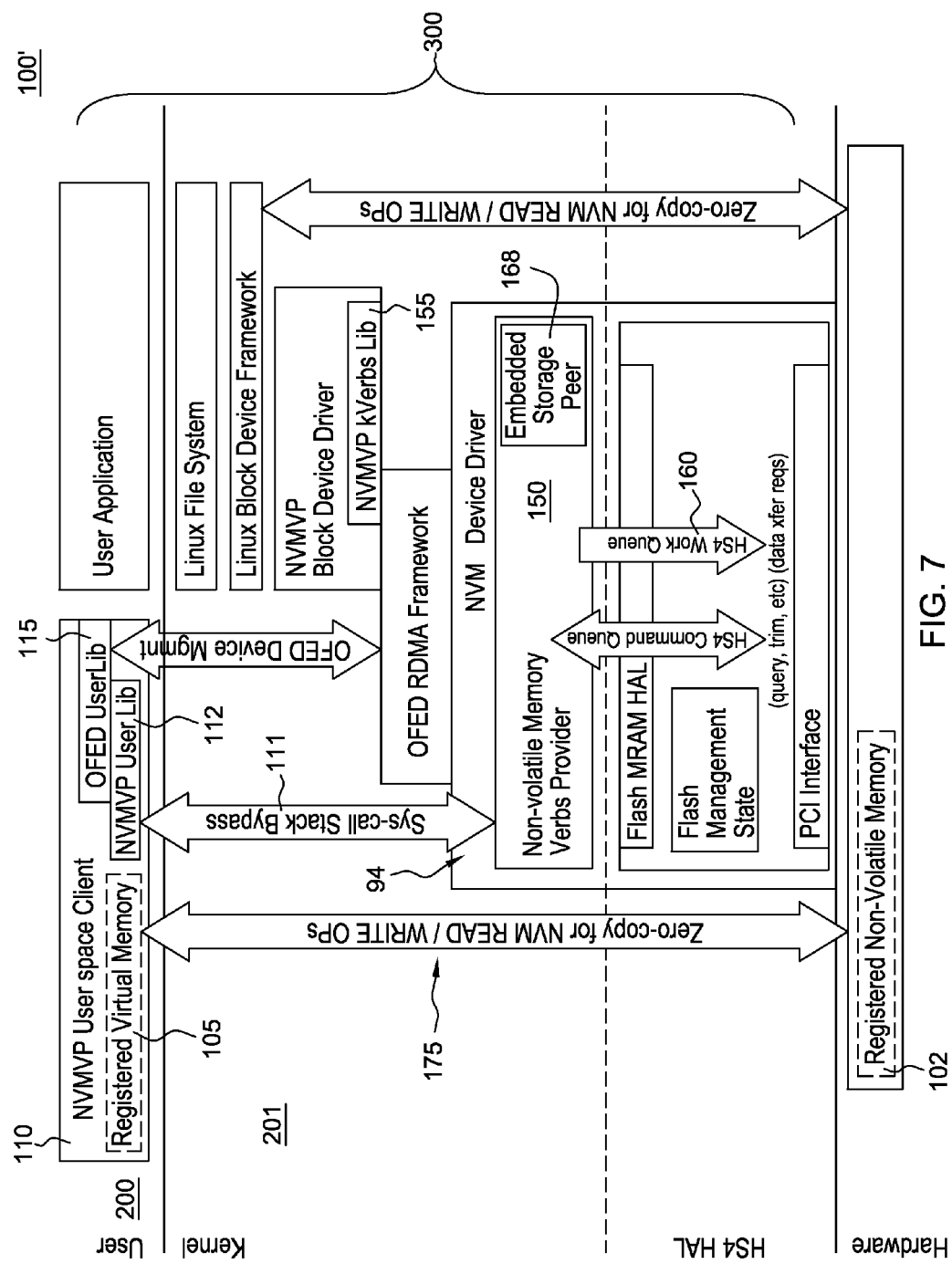
FIG. 7 shows a more detailed example of the software stack of FIG. 6 detailing further functionality.

FIG. 6 shows an abstracted example of a modified software stack 100 in which the present system and methods are operated and FIG. 7 shows a more detailed example of the software stack 100' of FIG. 6 detailing further functionality. This OFED™ stack presents a standards-based message passing interface for kernel and user applications, for use by a host device having an attached NVM storage system such as shown in FIG. 4.

As shown in modified software stacks 100 of FIGS. 6 and 100' of FIG. 7, a user level space client (NVP space client) is running on the host device that uses OFED™ interface to access the NVM 102. To enable the RDMA each chunk of memory to be written or read has to be registered. This results in the registered buffers 102 as shown in FIGS. 6 and 7. From the perspective of user space client this is seamless. The User space library 112 which provides OFED™ user interface (user standard calls) and NVP library 115 do actual communication with the NVP verbs provider 150 representing the embedded storage peer 168. The NVP user library 115 is hidden under the OFED™ user library 112 and functions as a translation layer between the OFED™ user library and the verbs provider 150 in the kernel. It converts layout of the OFED™ command that come from the user application into the form that the kernel NVM verbs provider 150 expects. The protocol between the two layers is specific to each verbs provider. In one embodiment, user level library performs functions to translate OpenFabrics Read and Write directives as issued by the calling application from and to referenced non volatile memory into Read and Write work requests placed into a send work request queue 160 shared with the NVM verbs provider150.

As further shown in FIG. 6, a HAL (Hardware Abstraction Layer) 170 is provided which generalizes access to a specific piece of hardware. For example, if the hardware changes, anything that uses the HAL for access will not have to be changed as known in the art.

As further shown in FIG. 7, a driver module 94 for non volatile memory is loaded into the operating system 120 to attach the non volatile memory hardware component 102 with the OpenFabrics infrastructure (e.g., ESP 168, HAL 170 and NVP 150 components).

An NVM application can either run in user space 200 or kernel space 201 because OFED verbs 115 provide both a kernel interface and a user space interface. Here, in FIGS. 6 and 7, the system 100, 100' includes components configured to provide "Zero copy" data transfer along path 175 between an application buffer 105, (i.e., a registered area in host memory or DRAM) and the registered NVM 102 (in the context of OFED framework, data is transferred directly from one registered buffer in NVM to another registered buffer in a virtual memory 105 associated with the host device). In one embodiment (not shown), non-volatile memory verbs are loaded as a separate module into to the O/S. In the implementation shown in FIGS. 6 and 7, the OFED compliant driver module 94 (e.g., an NVM device driver) is implemented as the verbs provider element 150 which accesses the device driver and access the non-volatile memory via sets of command queues 160. In another embodiment, NVP verbs may be loaded directly in both O/S and driver module components, to enable direct access to the NVM device. In an alternative implementation, the O/S is the NVM verbs provider, the verbs API calling the specific device driver.

The NVM verbs provider 150 further performs translations specific to hardware. For example, including taking verbs requests from NVP user library 112 and processing the requests in a send queue and looking at the data locations (e.g. checking alignment with any possible access requirements like page boundaries or data bus limits, which locations in the registered virtual memory of the user memory are required to be accessed and perform checks to see if the proper permissions are obtained by user and that it is correctly registered.

This processing results in a number of requests to the HAL 170 created for the particular memory card 94, e.g., NVM is the hardware in one example embodiment. Whatever hardware requires, the NVM verbs provider 150 will create the types of requests specific to the hardware.

Thus if a user wants to write, for example, 16 kByte of data to flash, then the translation performs splitting the requests into 2 requests given that the maximum request size for Flash on NVM cards is, for example, 8 kB (e.g., a hardware limitation). The request will therefore be split into two 8 kb requests. Data alignment checks are further performed, so if a flash page in NVM is crossed, the request must be split into smaller requests to respect the boundaries. Thus, there must be provided hardware specific translation checks in order to interface work requests to the NVM. Read and write commands include: an address in NVM, where to start reading/writing, and an address of a user memory buffer where the data should be transferred to/from, e.g., an address where the bytes are to be placed in application memory, and the length (in byte(s)) of the data to be transferred.

As further shown in FIG. 7, there is depicted a legacy path 300 for user applications, that require legacy block-level access via a standard Linux block device 194. To support this type of applications, the interface provides an NVP kVerbs library 155 to support kernel level clients such as an NVP Linux block device driver 194 that enables opening file, storing file, reading file, and closing file commands.

More particularly, in view of FIGS. 6 and 7 example commands received/issued include, but are not limited to: NVP user library 112: receives standard OFED user requests and translates them into NVM verbs provider (NVP) requests 111. Then, the NVM verbs provider 150: receives the requests 111 from the NVP user library 112 and translates them into requests that go to the NVM hardware driver, e.g., the NVM driver 94 using the HAL 160 interface. This translation involves the already described checks of register (NV-) memory regions and splitting of requests according to existing limits of the host system and the NVM hardware. On the completion path: The NVM verbs provider 150: receives completion notifications from the command queues 160 shared with the NVM driver 94, and emits completion notifications to the completion queue CQ. The NVP user library 112: receives CQ reap-requests from the OFED framework and checks the requested CQ for available completions from the NVP verbs provider. If a completion is found, it creates a standard OFED completion and hands it over to the OFED framework.

It is understood that Openfabrics Enterprise Distribution (OFED) is available on Linux-based operating systems, and is also supported on Windows, Oracle, HP, and AIX O/Ss.

Figure 8:
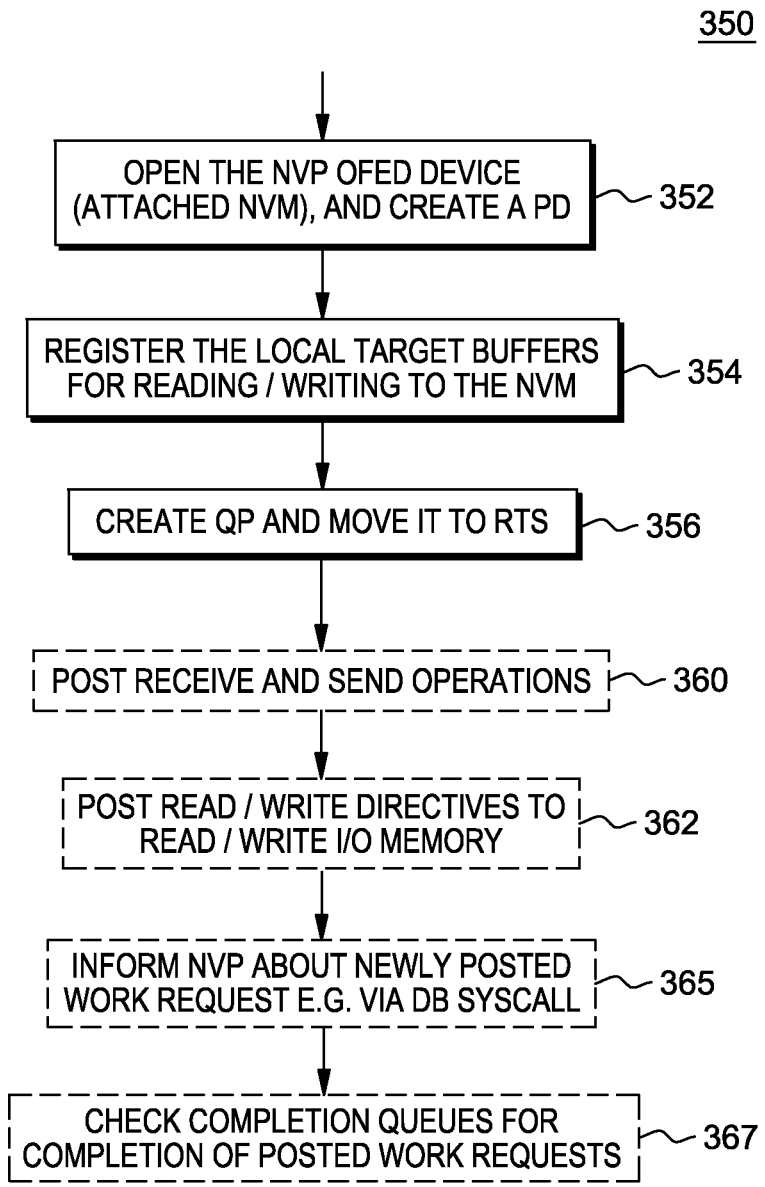
FIG. 8 illustrates example method steps that a user application (e.g., NVM application) will perform in connection with the software stack configuration of FIG. 6.

FIG. 8 illustrates example method steps 350 that a user application (e.g., NVM application) will perform in connection with the software stack configuration of FIG. 6. The system assumes a host device running an host operating system, e.g., a Linux O/S, Windows, etc., having a PCI attached flash adapter. Loaded into the O/S is an NVP NVM OFED verbs provider and, a virtualized local peer (ESP).

As shown in FIG. 8, there is performed NVP application operations, not limited to the particular order as depicted. At step 352, there is operated by a calling operation ("caller") the device management commands to Open the nvp OFED device, i.e., the host establishing the OFED interface to an attached NVM and creating a PD protection domain. A protection domain is established to allow only entities in the same protection domain to access QPs, CQs, registered memory areas, and other resources. This step involves the both the OFED framework and the NVM verbs provider. The methods executed at 354 by the caller then performs registering the local target buffers for reading/writing to the NVM memory. One example operation used to register memory is (reg_mr( )), having parameters passed such as the start address of the memory area, the length/size of the area and a set of access permissions and the protection domain. For example the caller can specify that the memory can only be read but not written.

While the NVM memory registration model is based on a remote procedure call (RPC) mechanism carried in Send/Receive work requests other further enhancements and embodiments include extensions to the existing standard invoking calls such as:

mr=ibv_reg_mr(pd  *,  void  *mem_id,  length, IBV_ACCESS_xxx|IBV_ACCESS_IOMEM including the ability to obtain a "mem_id" retrieved off-band from the verbs provider. In one implementation, which may be achieved via dedicated QP. Overloading of the virtual address parameter, which would be NULL for IO memory would free up the send/receive model for data if needed.

Then, in one embodiment, as shown in FIG. 8 at 356, a dedicated queue pair (QP) is created by calling a standard OFED Verbs API call. A specified status of a QP is required to be able to use this QP for data transfers and a QP status is set to Ready To Send (RTS). When a QP is created, it is usually just known and available to the local peer. To perform a data transfer, the QP needs to be made available or connected to the other peer (e.g., remote peer in OFED terms, Embedded Storage Peer in NVP terms).

The calling user application then, as shown as optional performed application step 360, may post Receive and Send operations to trigger storage specific functions in the Embedded Storage Peer (ESP). Storage specific functions include but are not limited to: learn partition parameters like the size, register I/O memory and associated RTag's that secures the memory of the Embedded Storage Peer.

The calling user application further at 362 may post READ/WRITE directives to read/write I/O memory into/from local registered buffer.

Then, at 365, in a further step, the method includes informing the kernel module about new pending READ/WRITE directives via a Doorbell (DB) function, which may be implemented as a dedicated DB system call. The dedicated doorbell system call provides an operation to call a kernel function from a user space application. It requires less processing and therefore executes faster than using the OFED™ provided post_send( )-system call path. The method associates a completion queue to a QP such that, when a QP is created, the user has to tell the OFED framework which completion queue to use for completed send/read/write and completed receives via the OFED standard. Thus, in a further step, there is performed checking the completion queues for completion of posted work requests as depicted at step 367, FIG. 8. The QP/CQ are a chunk of kernel memory, and by mapping this memory to user space, an extra copy of the work requests and completions can be avoided. This mapping step may be implemented as a further optimization to reduce the work request and work completion processing overhead.

Figure 9:
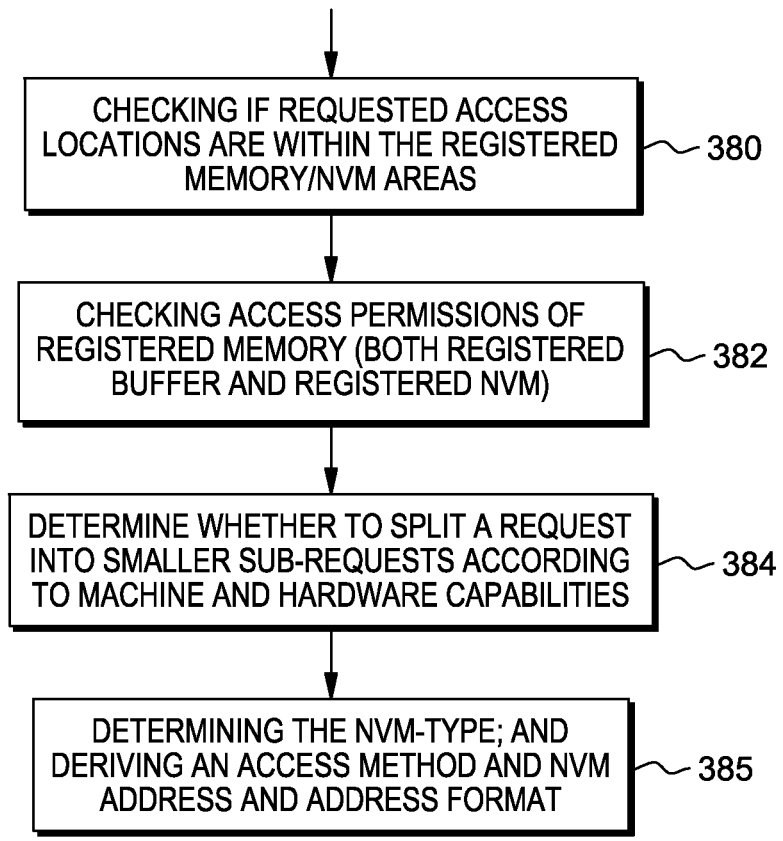
FIG. 9 depicts method steps performed in no particular order by the NVP user library functioning as a translation layer.

FIG. 9 depicts method steps 375 performed in no particular order by the NVP user library functioning as a translation layer. According to FIG. 9, at step 380, a translation includes, but are not limited to: checking if the requested access locations are within the registered memory/NVM areas; The method further includes determining at 382 any permission level requirements for the requested registered memory and checking access permissions of registered memory including both registered buffer 105 and registered NVM 102 of FIG. 6.

The methods further comprise: at 384, determining first the host machine and hardware capabilities, e.g., amount of registered NVM memory, etc., and determining whether to split a request into smaller subrequests according to machine and hardware capabilities. An example implementation includes having the host determine if the NVM consists of pages, or if the data transport path to NVM has any transfer limits or memory alignment requirements. For example, if a user wants to write, for example, 16 k Byte of data to flash, then the translation performs splitting the requests into 2 requests given that the maximum request size for Flash on NVM cards is, for example, 8 kB (e.g., a hardware limitation). The request will therefore be split into two 8 kB requests. Data alignment checks are further performed, so if a flash page in NVM is crossed, the request must be split into smaller requests to respect the boundaries. Thus, there must be provided hardware specific translation checks in order to interface work requests to the NVM. Read and write commands include: an address in NVM, where to start reading/writing, and an address of a user memory buffer where the data should be transferred to/from, e.g., an address where the bytes are to be placed in application memory, and the length (in byte(s)) of the data to be transferred.

There is finally performed at 385 determining the NVM type; and deriving an access method and NVM address and address format.

Figure 10:
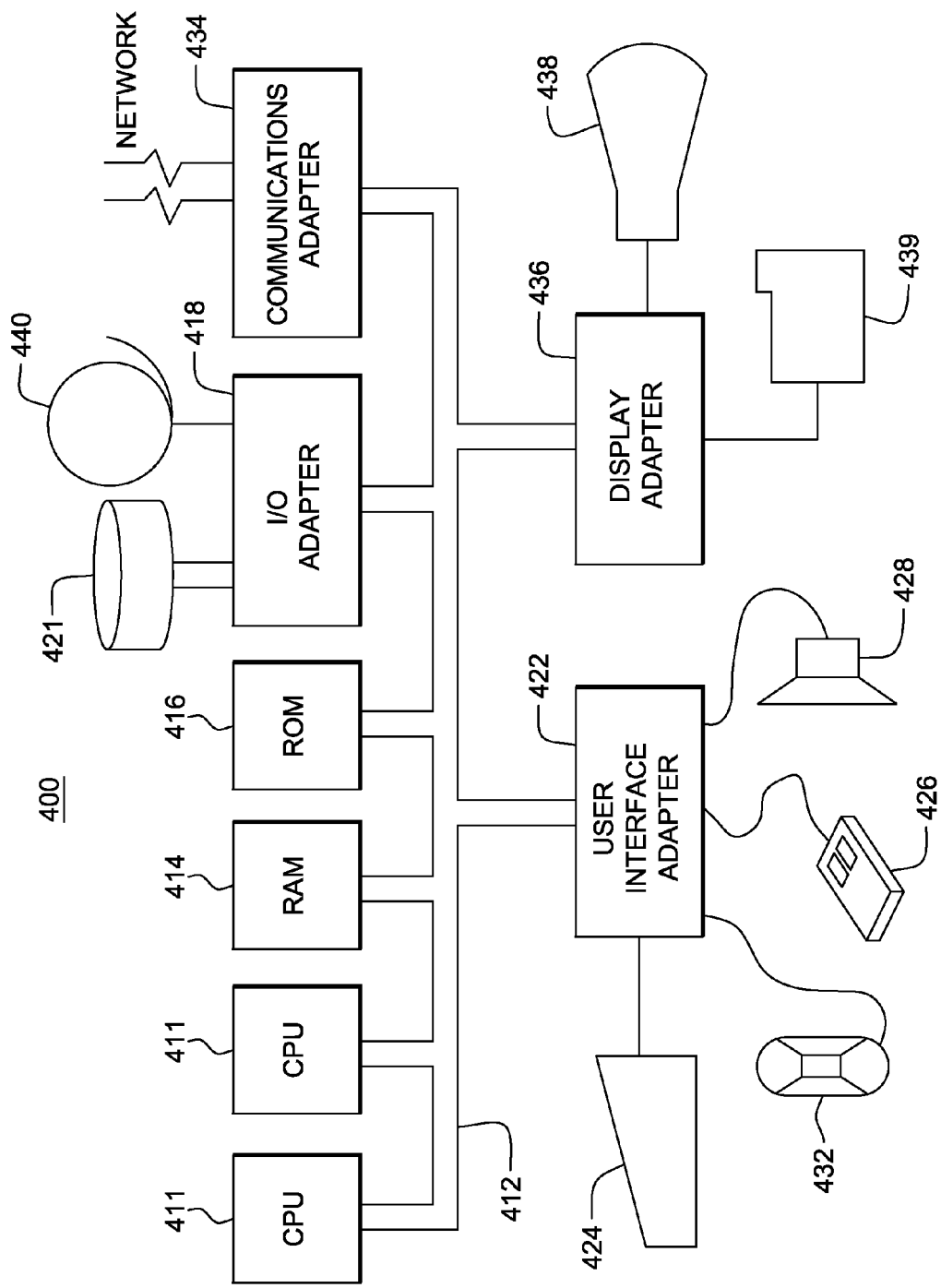
FIG. 10 illustrates a portion of a computer system, including a CPU and a conventional memory in which the present invention may be embodied.

FIG. 10 illustrates one embodiment of an exemplary hardware configuration of a computing system 400 programmed to perform the method steps described herein with respect to FIGS. 8 and 9. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer or the like).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing. The computer readable medium excludes only a propagating signal.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A method for accessing a non volatile memory system comprising:

embedding, in a computing system, a virtual representation of a remotely networked peer device configured to communicate in accordance with a remote direct memory access (RDMA) infrastructure for data storage and transfer among multiple networked devices, said RDMA infrastructure for data storage and transfer among multiple networked devices operating according to a switched fabric technology infrastructure for a local non-volatile memory (NVM) using RDMA directives at byte length granularity;

establishing, via said embedded virtual representation of said remotely networked peer device, a RDMA infrastructure interface between an application run by a host processing unit and the local NVM at the computing system, said interface comprising an NVM device driver as a NVM verbs provider element which accesses the local NVM via a set of command queues, wherein NVP verbs are loaded directly in both an operating system O/S and NVM device driver components to enable direct access to the NVM device;

registering said local NVM with said remote direct memory access (RDMA) infrastructure for read and write local NVM access, and processing received RDMA infrastructure Read directives to read data via said interface from said local non volatile memory at said byte length granularity, and processing received RDMA infrastructure Write directives to write data via said interface to said local non volatile memory at said byte length granularity, and said processing of said Read directives and Write directives comprising translating said directives into a format for use by said NVM verbs provider to transfer data directly between a registered buffer in the local NVM to another registered buffer in a virtual memory associated with the host processing unit, said Read directives and Write directives including an address in said local NVM where to start reading/writing, and an address of a user memory buffer where the data bytes are to be transferred from/to, and the length (in byte(s)) of the data being transferred, wherein a programmed processor unit is configured to initiate said embedding, said establishing, said registering, and said Read and Write directives processing.

2. The method of claim 1, wherein said local NVM comprises a flash non-volatile memory device as being one of: attached to or integrated in said computing system.

3. The method of claim 2, wherein said translating said directives into a format for use by said NVM verb provider to transfer data directly between a registered buffer in the local NVM to another registered buffer in a virtual memory comprises:
checking whether a requested access location is within the registered local NVM.

4. The method of claim 3, wherein said translating said directives into a format for use by said NVM verb provider to transfer data directly between a registered buffer in the local NVM to another registered buffer in a virtual memory comprises:
determining existence of any permission level requirements for the requested access location; and
checking access permissions of both the registered buffer in the local NVM and the registered buffer in the virtual memory associated with the host processing unit.

5. The method of claim 2, wherein said translating said directives into a format for use by said NVM verb provider to transfer data directly between a registered buffer in the local NVM to another registered buffer in the virtual memory comprises:
determining whether to split a Read request or Write request into smaller subrequests in accordance with a machine or hardware capability.

6. The method of claim 5, wherein a machine or hardware capability comprises a transfer limit or memory alignment requirement when using a transport path to said local NVM.

7. The method of claim 2, wherein said translating said directives into a format for use by said NVM verb provider to transfer data directly between a registered buffer in the local NVM to another registered buffer in the virtual memory comprises:
performing a data alignment check to determine if a page of memory in said NVM is crossed; and responsively,
splitting the request into smaller requests to respect page boundaries.

8. The method of claim 1, wherein said switched fabric technology infrastructure is an OpenFabrics Enterprise Distribution (OFED) standard.

9. The method of claim 1, wherein said registering comprises:
registering a target local NVM memory area of said NVM with said RDMA infrastructure for data storage and transfer among multiple networked devices, said Read directives enabling reading of data from said target local non volatile memory area via said interface; and
registering a source memory storage buffer with said RDMA infrastructure for data storage and transfer among multiple networked devices, said Write directives enabling writing of data content of said source memory storage buffer into said target local non volatile memory area.

10. The method of claim 9, further comprising:
extending an operating system (O/S) with kernel level components in said O/S to embed said virtual representation of a remotely networked peer device, and establish said RDMA infrastructure interface,
providing a driver module loaded into the O/S for communicating with an attached local non volatile memory hardware component with the RDMA infrastructure; and
activating RDMA infrastructure-compliant application level library components which are loaded with an application to enable accessing said local non volatile memory via said RDMA infrastructure interface.

11. The method of claim 10, further comprising:
providing, in a user client space, user level library components for translating said RDMA infrastructure Read and Write directives as issued by the application from and to referenced non volatile memory into Read and Write work requests placed into a send work request queue shared with the driver module.

12. The method of claim 11, wherein said driver module performs:
translating said Read and Write work requests derived from a send queue shared with an application library into commands issued to the local non volatile hardware component,
wherein said Read directives are translated by said driver module to program the local non volatile hardware component to directly transfer non volatile hardware buffer content referenced by said Read directive into an application buffer also referenced by said Read directive without further operating system involvement, and
wherein said Write directives are translated by said driver module into programming the non volatile hardware component to directly transfer the content of application buffers referenced by said Write directive into an non volatile hardware buffer also referenced by said Write directive without further operating system involvement.

13. The method of claim 12, wherein the programmed processor unit is further programmed to perform:
signaling a completion of Read directive and Write directive issued by an application to read or write to said local non volatile memory using said RDMA infrastructure, whereby a work completion queue is shared between said driver module and said user level library components, said method further comprising:
placing, by said driver module, work completions into said completion queue, and
obtaining, by said user level library components, work completions from said completion queue.

14. The method of claim 13, wherein said RDMA infrastructure provides a control interface between the application and the driver module, said method comprising:
issuing commands and retrieving command responses via said control interface, said commands including commands to set and retrieve configuration data about said local NVM including, existence of partitions, available local non-volatile memory types and local non-volatile memory size.

15. The method of claim 14, comprising:
implementing said control interface as said RDMA infrastructure for data storage connectivity providing "Send" directives to issue commands and "Receive" directives to retrieve command responses.

* * * * *